United States Patent [19]

Prucnal et al.

[11] 3,874,906

[45] Apr. 1, 1975

[54] PROCESS FOR APPLYING POLYESTER-ACRYLATE CONTAINING IONIZING IRRADIATION CURABLE COATINGS

[75] Inventors: Paul J. Prucnal, Monroeville; Charles B. Friedlander, Allison Park, both of Pa.

[73] Assignee: PPG Industries, Inc., Pittsburgh, Pa.

[22] Filed: Sept. 22, 1972

[21] Appl. No.: 291,475

[52] U.S. Cl....... 117/93.31, 117/123 D, 117/132 B, 117/138.8 A, 117/148, 117/155 UA, 117/161 K, 117/161 UC, 117/161 ZB, 204/159.16, 260/868

[51] Int. Cl. ............................. B44d 1/50, C08f 3/64

[58] Field of Search............. 117/93.31, 148, 161 K, 117/161 UN, 161 ZB, 161 UC; 204/159.15, 204/159.16; 260/885, 868

[56] References Cited

UNITED STATES PATENTS

| | | | |
|---|---|---|---|
| 3,455,801 | 7/1969 | D'Alelio | 117/93.31 |
| 3,468,861 | 9/1969 | Tietz et al. | 117/93.31 |
| 3,520,714 | 7/1970 | Miller | 117/93.31 |
| 3,531,547 | 9/1970 | Hazen et al. | 117/93.31 |
| 3,578,614 | 5/1971 | Wszolek | 117/93.31 |
| 3,669,716 | 6/1972 | Keyl et al. | 117/93.31 |

*Primary Examiner*—William D. Martin
*Assistant Examiner*—John H. Newsome
*Attorney, Agent, or Firm*—Carl T. Severini

[57] ABSTRACT

A method of applying and curing a polyester-acrylate containing coating composition with minimum volatility and toxic odor comprises adding to the composition N-vinyl pyrrolidone and applying the composition at low viscosity to a substrate and subjecting the coating to actinic light to cure.

9 Claims, No Drawings

3,874,906

PROCESS FOR APPLYING POLYESTER-ACRYLATE CONTAINING IONIZING IRRADIATION CURABLE COATINGS

The use of polyester containing compositions as coatings for a variety of substrates is well known. For the most part, these compositions are applied in solvent solutions and cured catalytically.

Recently the use of actinic light as a means of curing compositions such as polyester containing compositions has become popular. In this way little or no solvent need be used and the polyester containing compositions cure rapidly. Although this method of curing is of great utility in reducing air-pollution with the absence of solvents, the compositions with little or no solvents are quite viscous and are very difficult to apply to substrates.

In order to reduce the viscosity of the polyester containing compositions to an acceptable level for application purposes, various viscosity reducers have been added such as methyl methacrylate, styrene, butyl acrylate, methyl ethyl ketone, methyl isobutyl ketone, xylene, toluene, VM&P naphtha, and the like. These viscosity reducers, while adequately preparing the compositions for application, are quite volatile and odoriferous causing air-pollution during cure and they slow the curing rate of the polyester-containing compositions appreciably. As the use of apppreciable amounts of the viscosity reducers is not possible nor allowable in many states, the viscosity of the composition may be reduced only slightly with these additives.

It has now been discovered that the addition of N-vinyl pyrrolidone to a polyester-containing composition reduces the viscosity of the composition for application purposes, presents little pollution problem due to volatility, and not only does not slow the curing process when subjecting to actinic light but actually acts as an accelerator for the cure.

The polyester-containing compositions to be modified in this invention are unsaturated polyesters and polyester acrylates.

Any unsaturated polyester may be blended with the N-vinyl pyrrolidone.

The polyesters are ordinarily mixtures of (A) a polyester of an alpha-beta ethylenically unsaturated polycarboxylic acid, and (B) a polyhydric alcohol.

The ethylenically unsaturated polycarboxylic acids include such acids as:
  maleic acid
  fumaric acid
  aconitic acid
  mesaconic acid
  citraconic acid
  itaconic acid
  dichloromaleic acid
and halo and alkyl derivatives of such acids and the like; the preferred acid being maleic acid. The anhydrides of these acids, where the anhydrides exist, are, of course, embraced under the term "acid," since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyesters include:
  ethylene glycol
  diethylene glycol
  triethylene glycol
  polyethylene glycol
  propylene glycol
  dipropylene glycol
  polypropylene glycol
  glycerol
  neopentyl glycol
  pentaerythritol
  trimethylol propane
  trimethylol ethane
and the like. The preferred polyols for the purposes of this invention have a molecular weight of less than about 2000 and consist essentially of carbon, hydrogen and oxygen. The polyhydric alcohols are generally employed in an equal molar ratio to the total acid components, or as a slight excess, as, for example, about 10 mol percent excess.

Saturated dicarboxylic acids may be utilized in combination with the unsaturated acid or anhydride in the preparation of unsaturated polyesters. Such acids increase the length of the polyester without adding additional crosslinking sites, which is a desired feature in some polyesters. Examples of useful dicarboxylic acids which are either saturated or only aromatically unsaturated include:
  succinic acid
  adipic acid
  suberic acid
  azelaic acid
  sebacic acid
  phthalic acid
  isophthalic acid
  terephthalic acid
  tetrachlorophthalic acid
  tetrabromophthalic acid
and the like. As in the case of the ethylenically unsaturated acids, the anhydrides of these acids, where the anhydrides exist, are, of course, enbraced in the term "acid," since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. Such "saturated carboxylic acids" may also be referred to as "non-olefinically unsaturated" polycarboxylic acids.

A particularly preferred polyester is formed from a glycol and about 50 percent of an unsaturated acid and 50 percent of a saturated acid. An example is the polyester formed from neopentyl glycol and equimolar amounts of adipic acid and maleic anhydride.

Polyester acrylates useful herein are generally one of two classes. The first class is the reaction product of a member of the group consisting of acrylic acid and methacrylic acid with a polyglycidyl ether of a polyphenol or polyhydric alcohol.

The acid may be reacted with any polyglycidyl ether of a polyphenol or polyhydric alcohol. The preferred reactants are the polyglycidyl ether of a polyphenol such as Bisphenol A and acrylic acid. Other polyglycidyl ethers may be attained, for example, by etherification of a polyphenol with epichlorohydrin or dichlorohydrin in the presence of an alkali. The phenolic compound may be 2,2-bis (4-hydroxyphenyl)propane, 4,4'-dihydroxybenzophenone, 1,1-bis(4-hydroxyphenyl)ethane, 2,2-bis(4-hydroxy-tertiarybutylphenyl)propane, bis (2-hydroxynaphthyl)methane, 1,5-dihydroxynaphthalene, or the like. The polyphenol can also be a novolak resin or a similar polyphenol resin.

Such polyglycidyl ethers of polyphenols correspond to the average formula:

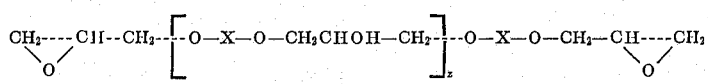

in which X represents an aromatic radical and z represents a whole or fractional small number.

Examples of this class of polyepoxides are the reaction products of Bisphenol A and epichlorohydrin, which correspond to the structure:

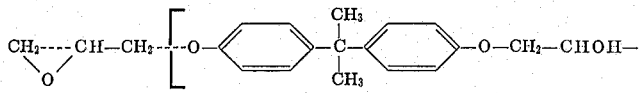

in which z represents a whole or fractional small number.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,4-butane diol, 1,5-pentanediol, 2,4,6-hexanetriol, glycerol, trimethylolpropane, and the like.

The acrylic or methacrylic acid and polyglycidyl ether are generally reacted in a temperature of from about 70°C. to about 150°C. and polymerization inhibitors such as di-tertiary butyl phenol, and the like, and catalysts such as quarternary ammonium salts, diisobutyl cresoxy ethoxy ethyl dimethyl benzyl ammonium chloride, and the like, may be used in amounts of from about 0.1% to about 5%. Any molar ratio of acid to polyglycidyl ether may generally be used as the reaction is carried out stoichiometrically. However, the molar ratio of acid to polyglycidyl ether is generally about 2:1.

The second class of polyester-acrylates quite useful herein have the formula:

wherein R is a divalent saturated or unsaturated aliphatic hydrocarbon radical having 2 to 10 carbon atoms, R' is divalent aliphatic hydrocarbon radical having 2 to 10 carbon atoms, R" is selected from the class consisting of hydrogen and methyl, and n is an integer having a value of 1–14. Examples of these polyester-acrylates are found in U.S. Pat. Nos. 3,455,801 issued July 15, 1969, 3,455,802 issued July 15, 1969, 3,485,732 issued Dec. 23, 1969 and 3,485,733 issued Dec. 23, 1969, all of which are incorporated herein by reference.

Prior to the curing of the composition N-vinyl pyrrolidone monomer is added. The amount of N-vinyl pyrrolidone added should be from about 2 percent to about 60 percent by weight based on the weight of the polyester containing composition. The monomer may be merely mixed with the polyester containing composition without aid of catalysts or elevated temperatures.

The polyester containing compositions may also comprise vinyl monomers which crosslink with unsaturated polyesters such as
styrene
divinylbenzene
methyl acrylate
methyl methacrylate
hexyl acrylate
2-ethylhexyl acrylate
octyl acrylate
octyl methacrylate

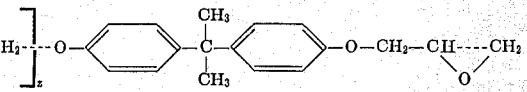

2-hydroxyethyl acrylate
vinyl toluene
p-tertiary butyl styrene
ethylene glycol diacrylate
vinyl acetate vinyl propionate
vinyl benzoate
allyl cyanide
butyl vinyl ether
cetyl vinyl ether
diallylphthalate
triallyl isocyanurate
allyl acrylate
2-methoxyethyl acrylate and the like. The preferred vinyl monomers are liquid compounds, soluble in the polyester components. Such monomers should preferably be free of non-aromatic carbon-carbon conjugated double bonds. The more volatile monomers should not be used in large volume.

The compositions may also contain conventional additives such as fillers, pigments, plasticizers, and the like.

The coating compositions may contain photosensitizers to aid in the actinic light curing of the compositions. Various common photosensitizers are benzoin, benzoin methyl ether, diphenyl disulfide, dibenzyl disulfide, benzil, benzophenone, xanthone, acetophenone, anthroquinone, and the like, Generally the coating may comprise from about 0.01 percent by weight of the photosensitizer to about 10 percent by weight of the photosensitizer.

The novel method of this invention may be used to coat substrates with polyester-containing compositions by merely applying the composition to the substrate and subjecting the coating to actinic light to cure in situ.

Any conventional means of applying the composition to the substrate may be used as dip coating, roll coating, spraying, and the like. In order to easily apply the coating the composition should have a viscosity of about 1000 cps. or less. This is obtained with the addition of the N-vinyl pyrrolidone without causing volatility problems and slowing the cure.

The coatings are cured to a hard, mar-free, generally stain resistant film by subjecting to actinic light. In general, the use of wave lengths in which sensitivity to actinic light occurs is approximately 1800 to 4000 Angstrom units. Various suitable sources of the actinic light are available in the art including by way of example, quartz-mercury vapor lamps, ultraviolet cored carbon arcs, and high-flash lamps.

Various substrates may be coated with the compositions of this invention. Some examples are paper, metallic substrates, plastics and cellulosic substrates.

The coated substrates are quite useful for plywood paneling, cabinets, furniture, printed paper products, cement, and cement asbestos products, and the like.

The following examples set forth specific embodiments of the invention. However, the invention is not to be construed as being limited to these embodiments for there are, of course, numerous possible variations and modifications. All parts and percentages of the examples as well as throughout the specification are by weight unless otherwise indicated.

EXAMPLE 1

A polyester acrylate formed by reacting acrylic acid and a bisphenol A-epichlorohydrin epoxy (Epon 828) was modified to lower its viscosity to allow it to be easily coated onto an aluminum substrate by the addition of N-vinyl pyrrolidone and various commonly used viscosity reducing agents. The compositions were prepared by adding 50 parts of the viscosity reducing agent to 50 parts of the polyester acrylate and 2 parts of isobutyl benzoin ether (a photosensitizer) and the viscosity of the compositions were determined. The volatility of the reducing agents and odor produced therefrom and curing speed were measured by applying the coatings at the same thickness to aluminum substrates and curing under a medium pressure mercury vapor lamp (quartz) of 330 watts per inch output. Each pass was performed at 25 feet per minute and the coatings were run through until cured. The volatility was measured by calculating the percentage loss in the total coating. The results are shown in Table I.

Table I

| Example | Viscosity Reducing Agent | Volatility (% Loss) | Odor | Viscosity (Brookfield Viscosity in cps. | Cure Speed No. of Passes) |
| --- | --- | --- | --- | --- | --- |
| 1 | N-vinyl pyrrolidone | 6 | not objectionable | 100 | 2 |
| Control A | hydroxyethyl acrylate | 2.5 | strong odor | 160 | 1 |
| Control B | 1,4-butane diol mono acrylate | 3.0 | strong odor | 220 | 2 |
| Control C | 2-methoxy propyl acrylate | 9.0 | strong odor | 50 | 2 |
| Control D | epichlorohydrin-acrylic acid | 2.0 | not objectionable | 1420 | 1 |
| Control E | N-isobutoxy methyl acrylamide | 8.0 | strong odor | 290 | 1 |
| Control F | styrene | 38.0 | strong odor | 20 | 2 |
| Control G | dibutyl itaconate | — | not objectionable | 270 | no cure |
| Control H | none | — | not objectionable | 1,000,000+ | 1 |

It is thus seen that of all of the viscosity reducing agents only N-vinyl pyrrolidone, epichlorohydrin-acrylic acid and dibutyl itaconate have unobjectionable odors and epichlorohydrin-acrylic acid is not an effective viscosity reducing aid and no cure could be obtained with the dibutyl itaconate.

EXAMPLE 2

A composition comprising 50 parts of the polyester acrylate of Example 1, 40 parts of N-vinyl pyrrolidone and 1.8 parts of isobutyl benzoin ether was coated on an aluminum substrate and subjected to the UV source of Example 1. The composition cured in 2 passes and the viscosity was 180 cps.

EXAMPLE 3

A polyester resin was formed from 75 parts of a polyester formed from 7 moles of propylene glycol, 4 moles of diethylene glycol, and 10 moles of fumaric acid and 25 parts of styrene. To 43 parts of this polyester resin were added 28.5 parts of the polyester acrylate of Example 1, 26.5 parts of N-vinyl pyrrolidone and 2 parts of isobutyl benzoin ether. The viscosity of this composition was 320 cps. and the composition was cured with only one pass through the UV light source at 25 feet per minute.

EXAMPLE 4

A polyester resin was formed from 75 parts of a polyester formed from 7 moles of propylene glycol, 4 moles of diethylene glycol, and 10 moles of fumaric acid and 25 parts of vinyl toluene. To 65 parts of the polyester resin were added 15 parts of N-vinyl pyrrolidone, 10 parts of styrene, 7 parts of a wax-coated silica, and 3 parts of isobutyl benzoin ether. The composition had a viscosity of 500 cps. and upon curing with one pass under the UV lamp, the film had excellent mar-resistance.

EXAMPLE 5

A polyester resin was formed comprising 75 parts of a polyester formed from 7.5 moles of propylene glycol, 4 moles of diethylene glycol and 10 moles of maleic anhydride and 25 parts of vinyl toluene. To 53.2 parts of the polyester resin were added 8.2 parts of styrene, 13.5 parts of N-vinyl pyrrolidone, 20 parts of xylene, 6.4 parts of wax coated silica and 2.1 parts of isobutyl benzoin ether. The viscosity of the composition was 170 cps.

After curing with one pass under the UV beam at 15 feet per minute, the composition was cured and was capable of being rubbed with a cloth saturated with acetone 100 times without damage.

Although specific examples of the instant invention have been set forth hereinabove, it is not intended that the invention be limited solely thereto, but to include all the variations and modifications falling within the scope of the appended claims.

We claim:

1. A method of coating a substrate comprising applying to said substrate a low odor, low volatility, curable polyester-acrylate containing composition and subjecting the composition to actinic light to cure; said polyester-containing composition comprising
   A. a polyester-acrylate and B. from about 2 to about 60 percent by weight based on the weight of polyester-acrylate containing composition of N-vinyl pyrrolidone.

2. The method of claim 1 wherein the composition also comprises a photosensitizer.

3. The method of claim 1 wherein the viscosity of the composition is less than about 1000 cps.

4. The method of claim 1 wherein the composition additionally contains pigments.

5. The method of claim 1 wherein the substrate is a cellulosic material.

6. The method of claim 1 wherein the substrate is hardboard.

7. The method of claim 1 wherein the substrate is particle board.

8. The method of claim 1 in which said polyester-acrylate containing composition comprises A. a polyester-acrylate of the formula

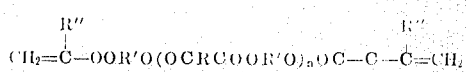

wherein R is a divalent saturated or unsaturated aliphatic hydrocarbon radical having 2 to 10 carbon atoms, R' is a divalent aliphatic hydrocarbon radical having 2 to 10 carbon atoms, R'' is selected from the class consisting of hydrogen and methyl, and $n$ is an integer having a value of 1–14, and B. N-vinyl pyrrolidone.

9. The method of claim 1 which said polyester-acrylate containing composition comprises A. a polyester-acrylate formed by reaction of acrylic or methacrylic acid with a polyglycidyl ether of a polyphenol or a polyhydric alcohol, and, B. N-vinyl pyrrolidone.

* * * * *